United States Patent [19]  
Descamps et al.

[11] 3,887,337  
[45] June 3, 1975

[54] FLUIDIZATION COLUMN
[75] Inventors: Freddy Francois Eugene Descamps, Halle; Georges Luciaan Dumont; Walter Remi Adele Goossens, Mol, all of Belgium
[73] Assignee: Studiecentrum Voor Kernenergie SCK, Brussels, Belgium
[22] Filed: Aug. 21, 1972
[21] Appl. No.: 282,226

[30] Foreign Application Priority Data  
Aug. 19, 1971  Belgium .............................. 771545

[52] U.S. Cl. ............ 23/284; 34/57 A; 259/DIG. 17
[51] Int. Cl. ...... B01j 1/00; F26b 17/14; B01f 13/02
[58] Field of Search ........ 23/284, 284.3, 288 S, .35; 34/57 A; 259/4, DIG. 17

[56] References Cited  
UNITED STATES PATENTS  
2,679,541  5/1954  Berg ................................... 260/679  
2,856,273  10/1958  Beber et al. ............. 259/DIG. 17 X  
3,647,188  3/1972  Solt .......................... 259/DIG. 17 X Primary Examiner—Morris O. Wolk  
Assistant Examiner—Roger F. Phillips  
Attorney, Agent, or Firm—Stevens, Davis, Miller & Mosher

[57]  ABSTRACT

A fluidization column with auxiliary gas lift mixing device to promote uniformity in a fluidized bed of particles with a range of particle density or particle size, said gas lift comprising a riser pipe and a bell inside which opens a duct for supplying, from outside the column, variable gas feed to the riser pipe, said bell being arranged in the fluidized bed with the lower side of the bell being about one centimeter above the column seive plate, said bell being open on the lower side, the bell upper side being connected to the lower end of the riser pipe.

1 Claim, 4 Drawing Figures

PATENTED JUN 3 1975 3,887,337
SHEET 2

FLUIDIZATION COLUMN

The invention relates to a fluidization column which comprises a hollow body, a perforated plate which separates inside said body a lower space from an upper space, at least one fluidization gas inlet at the height of the body lower space, at least one outlet by the top side of the upper space, a riser pipe which is arranged in the body with the lowermost end thereof above the perforated plate and the uppermost end thereof opening inside the upper space, and a duct the inlet of which lies outside the column for supplying gas to the riser pipe.

In fluidization columns, a fluidized bed is formed by the gas which is supplied to the column through the inlet and by powder-like material which is located on the perforated plate before introducing the fluidization gas in the column. The fluidization gas flow through the column is so adjusted that the gas velocity is high enough to raise the powder-like material from the plate, but low enough not to carry said material out of said upper space through the outlet thereof. It is known that the powder-like material then forms a bed in which the powder particles are loose relative to one another, in such a way that the gas may flow freely therethrough.

The perforated plate may be made in different constructive embodiments, for example, a netting of very fine wires.

The formation of the fluidizied bed may have as a purpose to have the fluidization gas react with the powder-like material of the bed. The powder-like material may also be a catalyst which promotes the reaction between components of the fluidization gas. The upper space may also be provided with supply openings through which an additional gas may be directed in said space, which additional gas should react with the fluidization gas or a component thereof under the action of the powder-like material serving as catalyst. Said additional gas may also have to react with the powder-like material which is fluidized by the fluidization gas which flows through the perforated plate.

In all of these cases the contact area between the powder particles and the gas is enlarged by the fluidization, as the powder particles are loose relative to one another. This increases the reaction rate. As the particles of the powder-like material take part by themselves in the reaction, the reaction rate is increased by the large contact area, as the limitations due to the diffusion phenomena for the reaction of the gas with the particles are minimized.

A fluidized bed has a very high heat conductibility and a relatively high heat transfer factor between the bed and the column wall. Due to said high heat conductibility and high heat transfer factor there will appear a more or less constant bed temperature and the removal and supply of heat from or to the column will be very easy to adjust.

In some cases the powder-like material is comprised of a mixture of two or more components with different density and particle size. Separation phenomena may then appear in the fluidized bed. Separation phenomena are disadvantageous because they may be the cause of bad fluidization or of bad heat transfer in the fluidized bed.

By nature, each component has a minimum fluidization velocity and a maximum fluidization velocity for the fluidization gas. The separation may be prevented by selecting the linear gas speed above the minimum fluidization velocity of the heaviest powder component. With such linear gas speed there appears a high turbulence in the fluidized bed which promotes a mixing of the two or more components of the powder-like material. A disadvantage of this solution is that the fluidization gas comsuption becomes high. Moreover there is a danger of eluting of the finer particles of the lighter component.

Another known solution to avoid the separation phenomena in the fluidization column lies in adjusting the particle size of the powder-like material components with strongly different densities. The heaviest component is then so pretreated that the particles thereof are smaller than the lighter component particles. The drawback with this solution is, of course, the requirement to proceed with an elaborate pretreatment of the components to be fluidized.

It is also already known to arrange inside the column a riser pipe of relatively large diameter, the lower end of which lies above the plate with openings and the upper end of which opens inside the column upper space.

In said riser pipe is then supplied the major part of the fluidization gas to cause a rising movement of gas and particles inside said pipe.

The diameter of said pipe is, for example, about half the diameter of the column upper space. In such a case a movable bed is obtained with a rising part inside the pipe and a sinking part in the space outside the pipe. A fluidization column with such a relatively large riser pipe may not be used practically to prevent the separation of powder-like components in a bed which should be completely steady.

The invention now provides a fluidization column the bed of which, considered as a whole, is steady and in separation of the powder-like material components may be prevented in a simple way without having to increase the fluidization gas consumption and without requiring an additional pretreatment of the components of the powder-like material to be fluidized to prevent the separation.

For this purpose the fluidization column according to the invention comprises a bell inside which opens a duct for supplying gas to the riser pipe, said bell being arranged in the upper space with the lower side thereof some distance away from the perforated plate, said bell being open on said lower side and the bell upper side being connected to the lower end of said riser pipe.

Preferably the spacing between the plate and the bell lower edge is about 1 cm.

In an advantageous embodiment, the ratio of the bell lower side area to the plate area lies between ½ and 1/10.

In a very advantageous embodiment of the invention, the ratio of the bell lower side area to the riser pipe cross-section lies between 3 and 50.

Other details and features of the invention will stand out from the description given below by way of non limitative example and with reference to the accompanying drawings, in which.

In the various figures, the same reference numerals pertain to similar elements.

Figure 1:
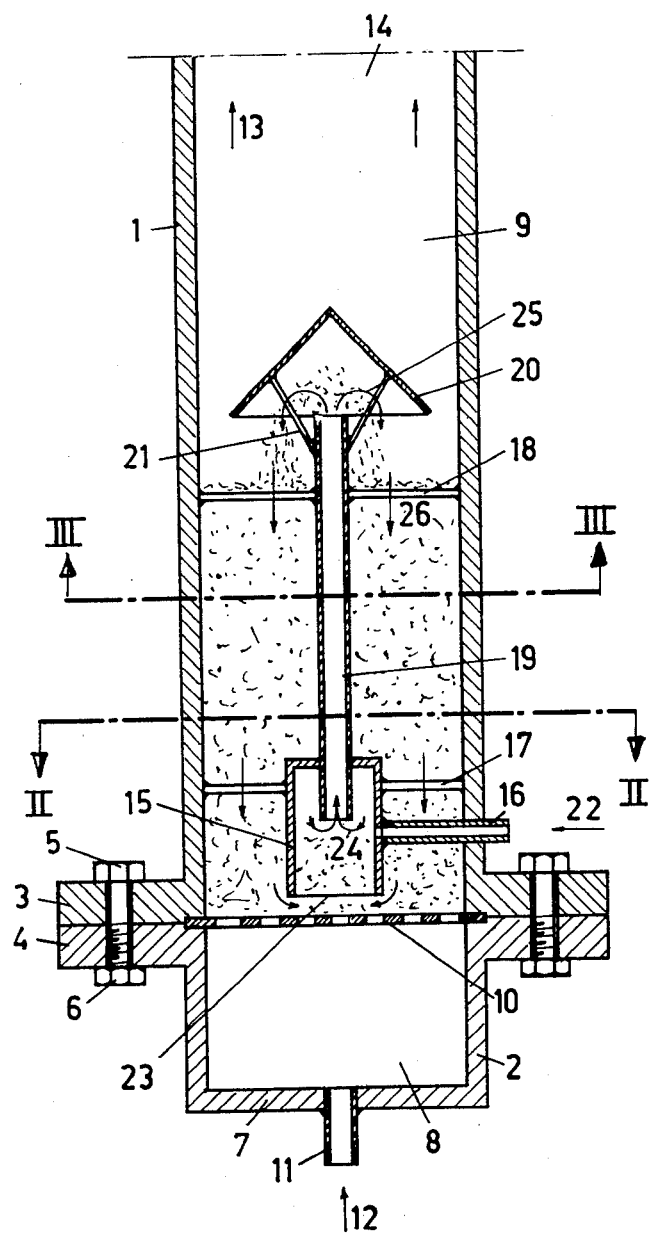
FIG. 1 is a vertical section through a fluidization column according to the invention.
Figure 2:
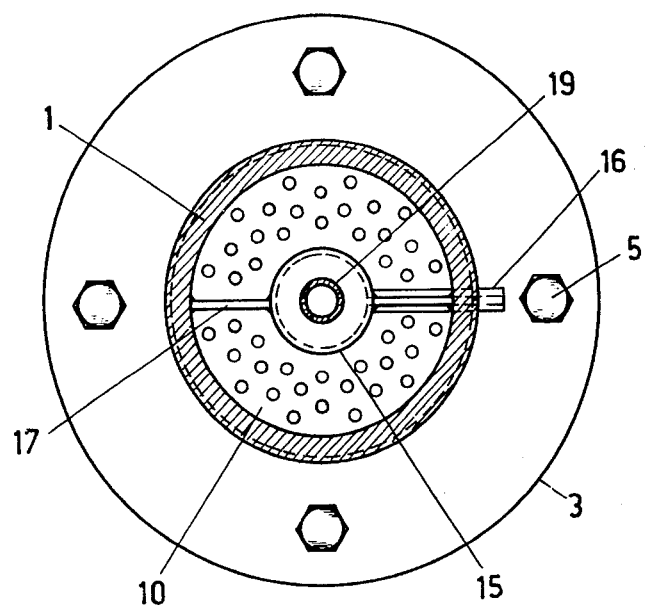
FIG. 2 is a cross-section along line II—II of FIG. 1.
Figure 3:
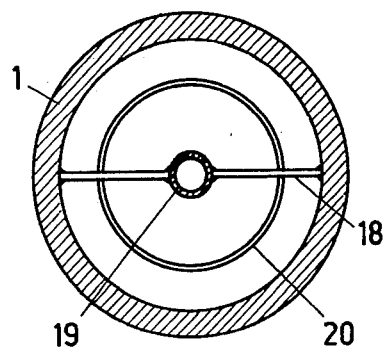
FIG. 3 is a cross-section along line III—III of FIG. 1.

The fluidization column as shown in FIGS. 1 to 3 is comprised mainly of a hollow cylindrical body the upstanding wall of which is in two parts. The wall upper part 1 is provided with a flange 3 and the lower part 2 is provided with a flange 4. A perforated plate 10 lies with the edge thereof clamped between the flanges 3 and 4 which are joined by bolts 5 and nuts 6. The lower part 2 of the upstanding cylindrical wall is integral with a bottom 7 in which is arranged an inlet nozzle 11 to be connected to a fluidization gas suply line. The bottom 7, the lower part 2 of the upstanding wall and the plate 10 bound a lower space 8. Above the perforated plate 10, the vertical cylindrical wall upper part 1 surrounds an upper space 9.

Through the supply line and the inlet nozzle 11, fluidization gas is introduced inside the lower space 8 along the direction of arrow 12. Said fluidization gas is distributed by the openings which are provided in the plate 10, and, thereafter, the gas follows its path along the direction of arrows 13 to leave the column through the outlet 14. To the outlet 14 may be connected filters which open, in turn, into a line which leads the gas to devices such as cyclones for the further treatment of the gas or to tanks.

Inside the upper space 9 is mounted a bell 15. Said bell 15 is open on the lower side thereof and remains with the lower edge 23 thereof about 1 cm. above plate 10. Bell 15 is connected through bars 17 to the upper part 1 of the vertical cylindrical wall. The area covered by said rods is neglectable relative to the plate area which corresponds to the column cross-section, in such a way that said bars 17 maintain said bell inside the column but do not interfer with the gas flow. In the bell side wall opens the conveying gas supply line 16. Said line goes through part 1 of the upstanding cylindrical wall, in such a way that conveying gas may be introduced inside bell 15 through said line along the direction of arrow 22.

The bell 15 is provided at the top with an outlet or riser pipe 19 which is connected by means of rods 18 to the upper part 1 of the cylindrical wall bounding the column. The rods 18 have but a neglectable area relative to the total horizontal cross-section of the column, so that said rods do not impede the gas flow.

The conveying gas supply line 16, the bell 15 and the riser pipe 19 form together a gas lift. Before operating the column, on plate 10 is laid powder-like material which should be fluidized by the fluidization gas which is introduced inside the column through inlet nozzle 11. As soon as fluidizing gas is forced from the inlet nozzle upwards through the column, the powder-like material is fluidized and a fluidization bed is formed. The purpose of the gas lift is to prevent separation phenomena. The space inside bell 15 is pressurized on the one hand through the fluidized phase around riser pipe 19 and, on the other hand, through the gas flow which is directly induced by the line 16 in bell 15.

In this way there appears an upwards flow from bell 15 to the riser pipe 19 and therefrom to the upper part of upper space 9. A flowing of the powder-like material along the direction of arrows 24 and 25 is thus obtained. Said powder-like material proceeds further along the direction of arrows 26, thus next to pipe 19 down to plate 10. Between pipe 19 and upper part 1 of the column cylindrical wall is thus formed a flow of solid material along a downwards direction, thus along a direction opposite to the fluidizing gas movement. The flow rate of conveying gas through supply line 16 and riser pipe 19 is relatively low. The adjustable flow rate of conveying gas allows the regulation of the solid material flow rate through the gas lift. When both components of the powder-like material laid on plate 10 inside the column are of such nature that, with the fluidizing gas flow rate passing through inlet nozzle 11 into the column, the component with the highest density or the largest particle size would settle rather rapidly on plate 10, this settling is prevented by means of the gas lift as the layer which would normally form on plate 10 is dispersed by the gas lift in the fluidized bed. For the gas lift to work correctly, the ratio of the area of the lower side of bell 15 to the plate area, corresponding to the column cross-section, should lie between ½ and 1/10. Further the ratio of the bell lower side area to the cross-section of riser pipe 10 should lie between 3 and 50.

To avoid the particles springing too high from riser pipe 19, said riser pipe 19 is provided with a cap 20 which is supported by bars 21. Said bars are thin enough not to impede substantially the outflow of gas and solid phase from pipe 19.

Tests have shown that cap 21 may possibly be dispensed with.

The perforated plate 10 may be constructed in various ways, thus also as a netting or a screen.

Figure 4:
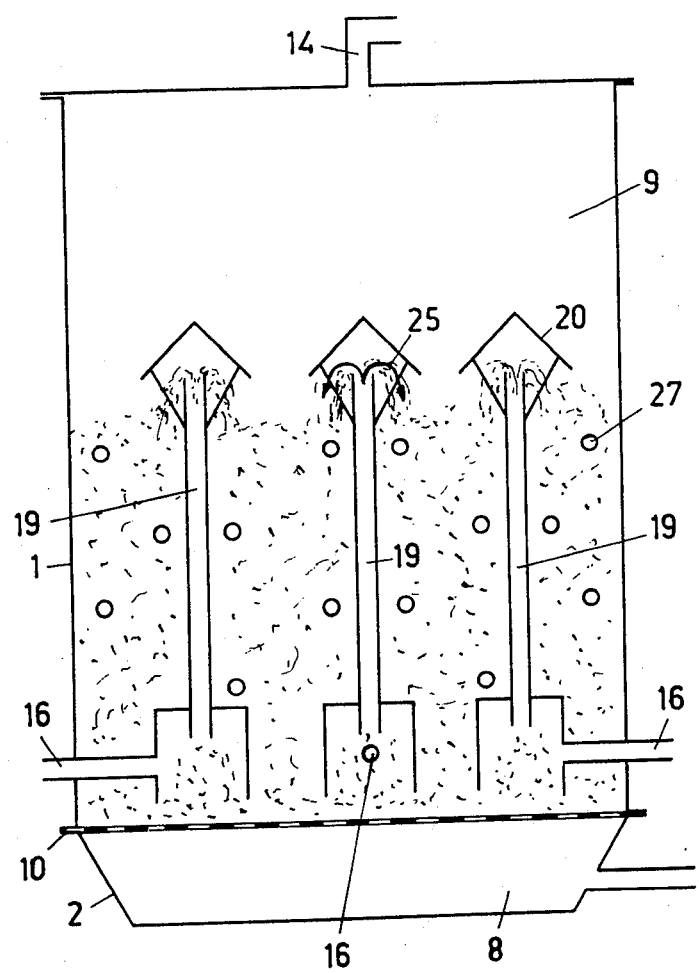
FIG. 4 is a more diagrammatic section through a second fluidization column according to the invention.

The embodiment shown diagrammatically in FIG. 4 differs from the embodiment shown in FIGS. 1 to 3, on the one hand, by the arrangement of a plurality of gas lifts for larger column cross-sections (larger fluidization scale) and, on the other hand, by the presence of supply openings 27 for reaction gas in the vertical wall bounding the column upper space 9.

Said upper space 9 is thus supplied not only with fluidizing gas from the lower space 8 through the openings in plate 10 and with conveying gas from line 16 in bell 15, but also with gas which should take part in the reaction and which is introduced directly through wall 1 inside upper space 9.

Tests have been performed with a fluidization column of the type shown in FIGS. 1 to 3.

Parts 1 and 2 of the column had an inside diameter of 94 mm. Bell 15 had an inner diameter of 50 mm and the riser pipe 19 had an inner diameter of 10 mm.

The screen 10 was comprised of a rigid netting made of Monel. The mesh size was 20 microns. The height of bell 15 was 40 mm. and the height of riser pipe 19 was 510 mm. Through inlet nozzle 11 nitrogen was introduced with an adjustable flow rate of about 4,000 litres/hour.

A first test was performed on a powder-like mixture comprised of 5 kg $UO_2$ with a density of 10 g/cc and a particle size larger than 177 microns and of 10 kg $Al_2O_3$ with a density of 4 g/cc and a particle size lying between 100 and 200 microns.

The first part of the test was conducted without the gas lift, that is without gas being supplied in the bell 15 through supply line 16.

After a few minutes of fluidization with nitrogen gas, a solid layer of $UO_2$ powder was formed on gas distributing plate 10.

Thereafter the gas lift was operated by supplying nitrogen with an adjustable flow rate between 100 litres/hour and 1,000 litres/hour along line 16 to bell 15.

The layer of solid powder disappeared thereby after a few moments fluidization. The components mixed anew did not show any separation phenomena, even after several hours of fluidization. A continuous stream of powder along the direction of arrows 24, 25 and 26 was noticed.

A second test was performed on a powder-like mixture comprised of 5 kg $UO_2$ with a particle size smaller than 177 microns and 10kg $Al_2O_3$ with a particle size lying between 200 and 100 microns. In the mixture were present fine particles of $UO_2$ with a particle size smaller than 37 microns. The gas lift was directly operated by introducing nitrogen with an adjustable flow rate between 100 litres/hour and 1,000 litres/hour along line 16 in the bell.

The fine particles of $UO_2$ were retained by outlet filters (not shown) which were arranged at the level of column outlet 14. The small particles which fell from said outlet filters were immediately covered with powder from the gas lift. Said fine particles were thus conveyed downwards in the fluidizing gas as the sinking speed of the said small particles is higher than the migration speed of the fine particles to the top.

There results from the above that the fluidization column according to the invention provided with the above-described gas lift has important advantages relative to the known fluidization columns.

The additional parts which form the gas lift may be manufactured and mounted inside the column cheaply and simply. Various bells with outlet pipes may be mounted inside one and the same column. A powder-like mixture comprised of components with strong separation characteristics may be loaded without further ado in the column. As the solid phase flows in counter-current to the gas phase, the column output may be increased. The counter-current frequency of gas and solid phase is increased in proportion with the solid material flow rate through the bell 15 and riser pipe 19, which promotes the chemical conversion.

There results clearly from the above that the column according to the invention is of great importance for the fluidization of powder mixtures with strong separation characteristics. The high conveying speeds, due to the gas lift, do not only avoid the separation but they also substantially reduce the elution of fine particles.

It must be understood that the invention is in no way limited to the above embodiments and that many changes may be brought therein without departing from the scope of the invention as defined by the appended claims.

We claim:

1. A fluidization column comprising a hollow body, a perforated plate across the body which separates the body internally into a lower space and an upper space, a fluidization gas inlet opening into the body lower space, an outlet from a top of the body upper space, a bell in the body upper space, said bell opening downward, being spaced from and facing the perforated plate, the spacing between said perforated plate and the bell lower edge being about 1 cm and the ratio of the bell lower side area to the plate lying between ½ and 1/10, an open-top riser pipe in the body upper space with the lowermost end of said riser pipe operatively connected through the top of said bell, the ratio of the bell lower side area to the riser pipe cross-section lying between 3 and 50, and a duct for supplying supplementary gas to the riser pipe, the inlet of which duct lies outside the body and which duct opens into the side of the bell.

* * * * *